United States Patent
Barthel et al.

(10) Patent No.: US 6,877,101 B2
(45) Date of Patent: Apr. 5, 2005

(54) DEVICE FOR CONTROLLING AND/OR MONITORING EXTERNAL TECHNICAL PROCESSES

(75) Inventors: Herbert Barthel, Herzogenaurach (DE); Georg Haller, Erlangen (DE); Andreas Schenk, Erlangen (DE); Hartmut Schuetz, Heroldsbach (DE)

(73) Assignee: Siemens Aktiengesellschaft, Munich (DE)

( * ) Notice: Subject to any disclaimer, the term of this patent is extended or adjusted under 35 U.S.C. 154(b) by 661 days.

(21) Appl. No.: 09/821,159

(22) Filed: Mar. 30, 2001

(65) Prior Publication Data

US 2001/0049564 A1 Dec. 6, 2001

Related U.S. Application Data

(63) Continuation of application No. PCT/DE99/02940, filed on Sep. 14, 1999.

(30) Foreign Application Priority Data

Sep. 30, 1998 (DE) .......................... 198 45 025

(51) Int. Cl.$^7$ ............................. G06F 1/14; G05B 11/01
(52) U.S. Cl. ......................................... 713/500; 700/12
(58) Field of Search ........................... 713/1, 100, 500, 713/501; 700/11, 12, 20, 21, 80

(56) References Cited

U.S. PATENT DOCUMENTS

| | | | | |
|---|---|---|---|---|
| 4,424,559 A | * | 1/1984 | Lorincz et al. | ................. 700/2 |
| 5,610,579 A |   | 3/1997 | Early et al. | |
| 5,657,193 A |   | 8/1997 | Purkayastha | |
| 5,721,737 A | * | 2/1998 | Radjabi et al. | ............. 370/449 |
| 6,101,419 A | * | 8/2000 | Kennedy et al. | ................ 700/3 |
| 6,317,638 B1 | * | 11/2001 | Schreder et al. | ............. 700/79 |

FOREIGN PATENT DOCUMENTS

| | | |
|---|---|---|
| DE | 41 33 636 A1 | 4/1993 |
| DE | 696 06 898 T2 | 10/1996 |
| DE | 197 27 733 A1 | 1/1999 |
| EP | 0 499 675 B1 | 2/1991 |
| EP | 0 499 675 B1 | 8/1992 |
| EP | 0540903 A1 * | 10/1992 ........... G05B/19/04 |
| WO | WO 92/13121 | 8/1992 |

OTHER PUBLICATIONS

English Translation of German Patent Application 41 33 636 A1 Published on Apr. 15, 1993, pp. 1–22.*
Description of the SSK signal switch card from Signalbau Huber, dated Oct. 15, 1992.
Description of the MTC 3000 system for use with the SSK, dated Feb. 1, 1993.
Description of the MTC 4000 control device family from Signalbau Huber, dated 1994.

(Continued)

Primary Examiner—Dennis M. Butler
(74) Attorney, Agent, or Firm—Sughrue Mion, PLLC

(57) ABSTRACT

Device (1) for controlling and/or monitoring external technical processes, in particular a device for use in connection with safety-related controls. The device includes an input functionality, an output functionality and a processing functionality that can be connected with at least one higher-level unit (5) for transfer of process-influencing and/or process-monitoring signals by way of a bus system (4) to and/or from actuators (3) and/or sensors (2) connected to the device. A guaranteed response time over the bus system (4) is determined on one hand by the cycle time of the higher-level unit (5) and on the other by the signal cycle time over the bus system (4) itself. In order to provide a shorter response time than this in appropriate circumstances, the device (1) uses the processing functionality thereof to execute logical links internally. The results are available for process control and/or process monitoring after a time interval that is shorter than the guaranteed response time of the higher-level unit (5) over bus (4).

13 Claims, 2 Drawing Sheets

OTHER PUBLICATIONS

Description of an ESST module from Signalbau Huber, dated Aug. 1993.
ESST safety instructions from Signalbau Huber, dated Oct. 1993.
System description of the line influencing system of Bosch Signalbau Huber AG, dated Oct. 14, 1995.
Order for the construction project for the line influencing system of Signalbau Huber, dated Nov. 24, 1995.
Acceptance document for the line influencing system of Signalbau Huber, dated Dec. 19, 1996.
Siemens, "SIMOCODE–DP 3UF5 system, motor safety and control device," Handbook, 1998, Order No. 3UF57 00–0AA00–0 issued by the Automation and Drive Technology Division, Low–Voltage Switchgear Area, dated 1998.

Siemens, SIMOCODE 3UF1/2 system, confirmation, dated 1986.

Siemens, "Switchgear equipment and system": The 96/97 catalog of low–voltage switching technology, Order No. E20002–K1002–A7 issued by the Drive Technology, Switchgear and Installation Technology Department, Low–Voltage Switchgear Area, dated 1996/97.

Babb, M.: "Motor overload protection becomes 'Communications–capable'," Control Engineering International, US, Cahners Publishing, vol. 43, No. 8, Jun. 1, 1996, pp. 69–70, 72, XP000621754, ISSN: 0010–8049.

* cited by examiner

DEVICE FOR CONTROLLING AND/OR MONITORING EXTERNAL TECHNICAL PROCESSES

This is a Continuation of International Application PCT/DE99/02940, with an international filing date of Sep. 14, 1999, which was published under PCT Article 21(2) in German, and the disclosure of which is incorporated into this application by reference.

FIELD OF AND BACKGROUND OF THE INVENTION

The present invention relates to a device for controlling and/or monitoring of external technical processes, in particular a device for use in connection with safety-related controls. The device has an input function, an output function and a processing function and can be connected to at least one higher-level unit for transfer of process-influencing and/or process-monitoring signals to actuators and/or sensors by way of a bus system.

A programmable controller that can operate alone with an input, an output and a processing function is known from European Patent EP 0 499 675 B1.

Field bus systems or peripheral bus systems that are on the market today can be used only in a limited way for time-critical safety applications because they have undetermined or unacceptably long response times. To date, known applications of the communication medium have the disadvantage that signals for the fast reactions required to ensure safety or security cannot be transferred at the required speed from the central unit over the bus to the decentralized peripheral stations. This is because the guaranteed response time over the bus exceeds the time required for fast reactions. In this process, the guaranteed response time over the bus includes at least the signal run times over the bus and the processing time required by the central unit. In turn, the central unit processing time is composed at least of evaluating the bus protocols, plus the time for evaluating the input signals and for calculating the output signals.

OBJECTS OF THE INVENTION

An object of the present invention is to decrease the reaction time of the process control with respect to alarm signals received from the process that are critical to safety or security.

SUMMARY OF THE INVENTION

This and other objects are solved by means of a device for controlling and/or monitoring an external technical process, in which the processing function of the device executes logical links. The results of these logical links are available for the process control and/or process monitoring after expiration of a time interval that is shorter than the response time of the communication and the higher level unit. In this process, these results are evaluated by the device itself for triggering operation of an actuator.

In many automation processes an immanent asymmetry exists between, on the one hand, logically deep functions, e.g. switch-on functions with long calculation times and slow-request switch-off functions (for example in two production lines, a stop of the first production line should cause a 'slow stop' of the second production line) and, on the other hand, logically flat shut-off functions with short calculation times. It is precisely this asymmetry that the device according to the preferred embodiment of the present invention is directed. This is because the logically flat shut-off processes can be processed by the device itself using the internal processing functionality, while signals relating to switch-on processes continue to be processed by the higher-level unit. These are then sent over the bus from the higher-level unit to the process and from the process to the higher-level unit. Logically deep functions include complex functions, in particular those that require a lengthy series of logical operations to achieve the calculated result. Logically flat functions, on the other hand, are more simple functions requiring only one or few calculation steps.

BRIEF DESCRIPTION OF THE DRAWINGS

The invention and further advantageous refinements of the invention according to the features of the dependent claims are explained in more detail below with the aid of the diagrammatic, exemplary embodiments in the drawings, in which:

DETAILED DESCRIPTION OF THE EMBODIMENTS

Figure 1:
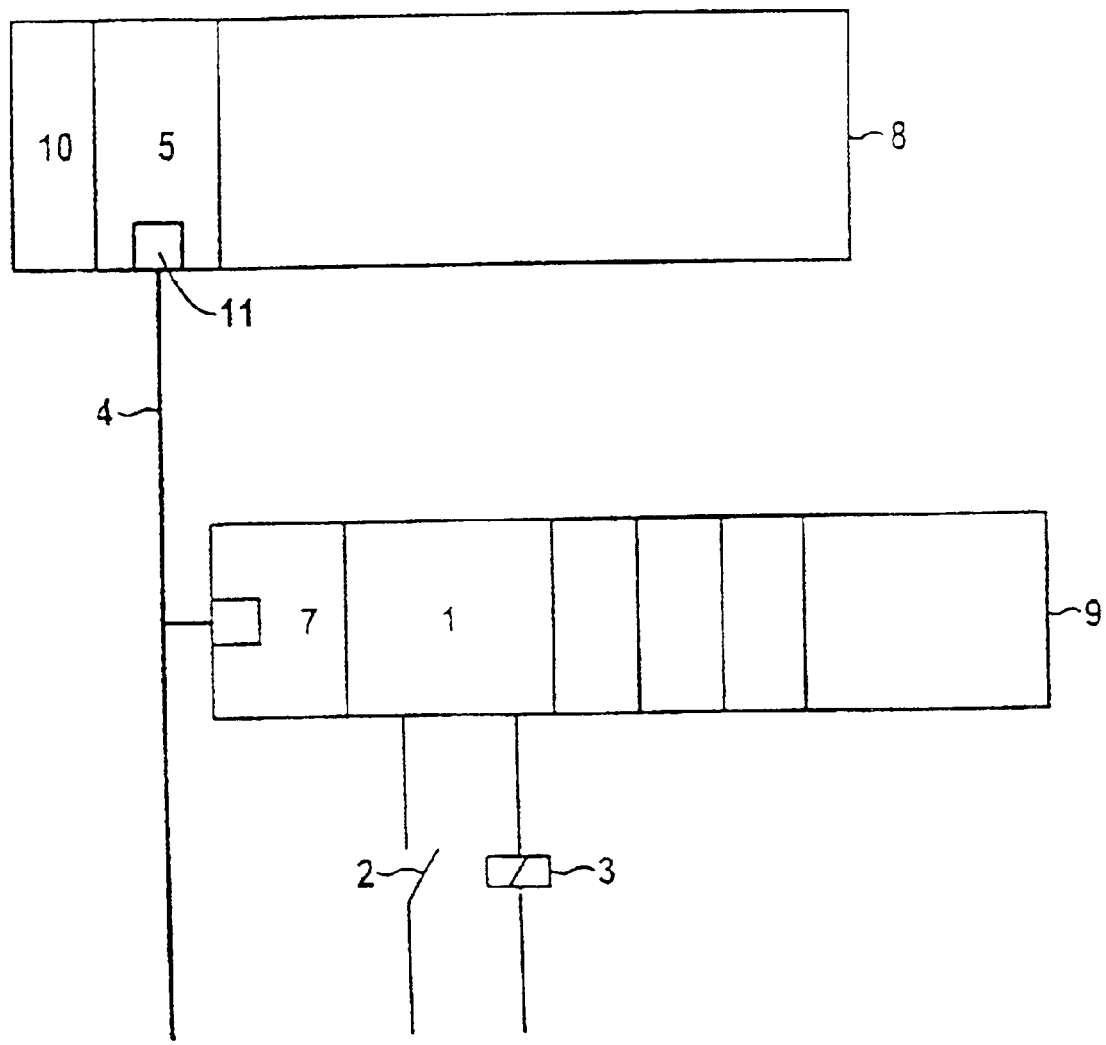
FIG. 1 is a functional block diagram of a system used, e.g., in a manufacturing line, illustrating a first embodiment of the invention.

The arrangement shown in FIG. 1 contains a higher-level programmable controller in a central frame 8 with a central unit 5 and an associated power supply 10 that generates the required extra-low operating voltages from a network power supply. A field bus 4 is controlled by the integrated bus interface 11 of the central unit 5, operating as a bus master. In addition, the arrangement contains one or more expansion frames 9 which each contain a bus coupling module 7, peripheral modules, not shown, for standard actuation and/or monitoring of an external technical process, as well as, the device 1 according to the invention. The device 1 is designated in the following description as a mixed module 1 for short because of the integration of input, output and processing functions. The mixed module is connected to one or more actuators 3 and/or sensors 2.

For example, a punch for a hydraulic press can be set into operation by actuation of an actuator 3. The logical links needed for this are essentially carried out by a central unit 5. To do this, the central unit 5 has available to it, in particular, data from other decentralized peripheral stations for linking. For example, this can be used in sequential processing of the respective work pieces in a manufacturing line.

A sensor 2 is provided to implement an emergency-off function, which according to the embodiment makes a fast shut-off of the hydraulic press possible in the case of a malfunction or hazard. An application like this requires that the press be shut off within a specified time. In order to fulfill this safety function, the time specified should be, e.g., less than 10 ms.

The undetermined reaction time (or relatively slow, e.g., >30 ms reaction time) over the field bus 4 does not guarantee this shut-off time. Thus, according to the present invention, the processing of the input signal received from the sensor 2 in the case of a malfunction or hazard takes place in the mixed module 1 itself. In the simplest case, this is a matter of an IF-THEN link that will shut off the actuator 3 as soon as an input from the sensor 2 is present. In other words, the processing function of the mixed module 1 is enhanced for processing corresponding logically "flat" links.

Since a logical link of this type occurs in the mixed module 1, independently of the bus cycle or of the cycle of central unit 5, a quasi-immediate shut-off of the actuator 3 is ensured. In this process, the time difference between actuation of the sensor 2 and shut-off of the actuator 3 is essentially specified by the internal cycle time of mixed module 1. Because of the logically flat links that the mixed module 1 processes, this time is very short in comparison to the combined reaction times of the bus 4 and the central unit 5. As a result, a fast reaction shut-off is ensured by the mixed module 1.

Basically, the function of the mixed module 1 does not differ from the function of a so-called compact control, i.e., of a control with processing function. For example this may be the control of a CPU in a more powerful memory programmable controller. However, in a compact module such as this, input and output functionalities are provided directly. In a CPU with expansion modules, the input and output functionalities are reserved for the respective input or output modules.

The module 1 preferably contains a relatively small number of logic functions, time function elements and/or comparators, etc. The logical links are preferably programmed by the end user. The logic operations are carried out by means of, e.g., a microprocessor or a programmable logical unit (programmable array logic PAL/ROM/EEPROM, solid-state elements, etc.). The module 1 can be coupled to the bus 4 either directly or indirectly as a sub-component of an element such as expansion frame 9. In addition, it is readily possible to design the arrangement so that signal states within the module 1, as well as inputs and outputs thereof, can be provided to the higher-level unit, for monitoring purposes.

Figure 2:
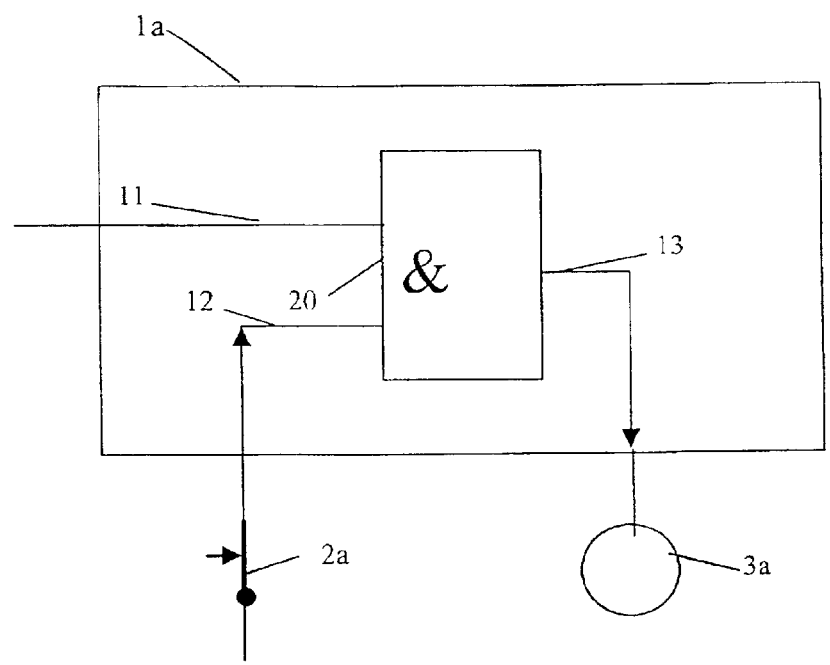
FIG. 2 is a functional block diagram of all or part of a module according to a second embodiment of the invention.
Figure 3:
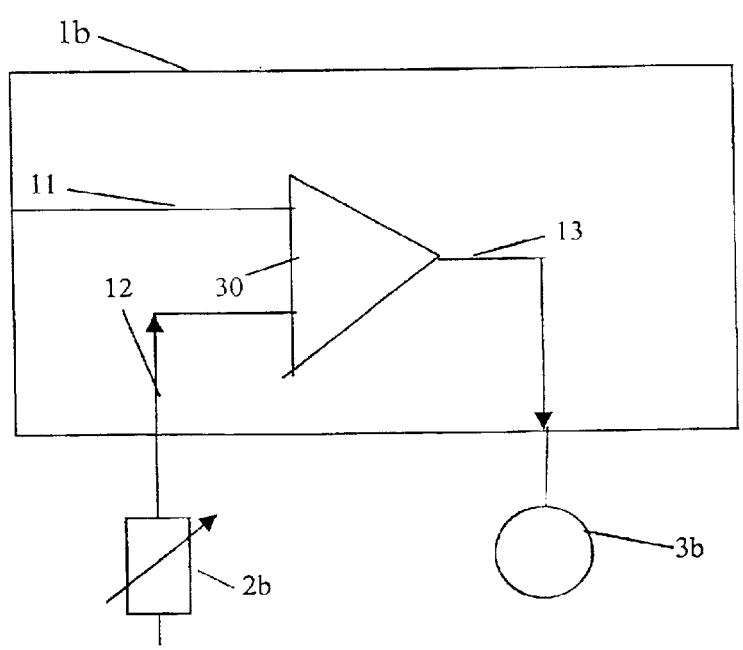
FIG. 3 is a functional block diagram of all or part of a module according to a third embodiment of the invention.

FIGS. 2 and 3 show two variants of a simple mixed module 1*a*, 1*b*. In the case of mixed module 1*a* in FIG. 2, an AND gate 20 has a first input 11 from the central unit 5 and a second input 12 directly from a switching sensor 2*a*, shown here in the closed position. Under normal operating conditions, both of the inputs 11 and 12 will be in a logic "1" state and the actuator 3*a* will be in operation as well. However, whenever either of the input signals becomes a logic "0", then the logic gate 20 sends an output 13 to the actuator 3*a* to immediately cease operation and come to a standstill. The higher level input is typically the result of complex computations relating to the operational states of associated tools and units on the same manufacturing line. Such associated units include, e.g., units that deliver parts to a machine press 3*a*. Thus, the central unit 9 typically is provided with data defining the current processing states (e.g. manual, automatic, current status of neighboring and associated units, etc.) and is programmed to process all the controlling and monitoring functions that can be carried out safely even with relatively slow reaction times (e.g. >30 ms). However, any applications that require shorter reaction times, in particular those relating to safety, are processed directly in the module 1*a*. For instance, the sensor 2*a* may be either an optical sensor (e.g. light barrier) that detects that an operator's limb has inadvertently entered the hazard area of a machine press, or a mechanical emergency foot pedal. In either case, triggering of the sensor 2*a* produces a signal change on the local input line 12, which is processed locally in the mixed module 1*a*, in order to stop the actuator 3*a* as rapidly as possible. The actuator 3*a* may be, .e.g., a motor drive of a machine press or a robotic drive.

FIG. 3 shows yet another variant of a simple module 1*b*. Here, the output of a sensor 2*b* is supplied via signal line 12 to one input of a comparator 30. The comparator 30 compares the sensor signal 12 with a signal value input via signal line 11 and outputs an actuator control signal 13 accordingly to the actuator 3*b*. The signal value input 11 may originate, e.g., from the center unit 5, or, alternatively, may be a signal state originating within the mixed module 1*b*.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A device for at least one of controlling and monitoring an external technical process comprising:
   an input functionality;
   an output functionality;
   a processing functionality; and
   a plurality of logical links executed exclusively by said processing functionality, results of said logical links being made available after expiration of a specific time interval determined by said device, said device being connected with at least one higher-level unit for transfer of at least one process signal by way of a bus system to and from a plurality of components connected to said device, whereby a response time is determined by a cycle time of the at least one higher-level unit and by a signal cycle time over the bus system,
   wherein said results of said logical links are made available after the expiration of a time interval that is shorter than said response time and can be evaluated by said device for triggering actuators, and
   wherein said at least one process signal relates to a switch-on function that is transferred from the at least one higher-level unit by way of said bus to said device and then to at least one of said components that controls and monitors the external technical process, and said logical links relate to a shut-off function that is processed exclusively by said processing functionality of said device.

2. The device according to claim 1, wherein said at least one process signal is a process-influencing signal.

3. The device according to claim 1, wherein said at least one process signal is a process-monitoring signal.

4. The device according to claim 1, wherein said plurality of components comprises at least one sensor.

5. The device according to claim 1, wherein said plurality of components comprises at least one actuator.

6. The device according to claim 1, wherein said plurality of components comprises components that control or monitor a safety parameter of the external technical process.

7. The device according to claim 1, wherein said results from the processing of said logical links are made available after no more than 10 ms.

8. A mixed module for decreasing the reaction time of a process control system comprising:
   an input function for receiving an input signal from at least one sensor detecting a specific operating condition of a process,
   an output function for sending a shut-off signal to an actuator in said process, and a processing function for processing at least one corresponding logical link, wherein said logical link is processed independently from a bus cycle, and a time for sending the shut-off signal to said actuator is determined by an internal cycle of said mixed module.

9. The mixed module according to claim 8, wherein said sensor and actuator respectively monitor and control at least one safety parameter of said process.

10. A method, comprising:

receiving a first sensor signal from a sensor;

in response to the first sensor signal, transferring a process signal from a first unit via a bus to a central processing unit;

forwarding a response signal from the central processing unit to the first unit within a guaranteed response time;

receiving a second sensor signal from the sensor; and in response to the second sensor signal, processing the second sensor signal within the first unit within a time less than the guaranteed response time.

11. The method according to claim 10, wherein the second sensor signal is an alarm signal.

12. The method according to claim 10, wherein processing the second sensor signal comprises executing one of a plurality of predetermined logical relationships between predefined ones of the sensor signals, including the second sensor signal, and desired response signals.

13. The method according to claim 10, further comprising:

subsequent to processing the second sensor signal, outputting a response signal directly to an actuator without sending the response signal via the bus or the central processing unit.

* * * * *